(12) United States Patent
Schibsbye

(10) Patent No.: US 9,375,861 B2
(45) Date of Patent: Jun. 28, 2016

(54) TOWER

(71) Applicant: SIEMENS AKTIENGESELLSCHAFT, München (DE)

(72) Inventor: Karsten Schibsbye, Fredericia (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/364,302

(22) PCT Filed: Feb. 13, 2013

(86) PCT No.: PCT/EP2013/052858
§ 371 (c)(1),
(2) Date: Jun. 11, 2014

(87) PCT Pub. No.: WO2013/120889
PCT Pub. Date: Aug. 22, 2013

(65) Prior Publication Data
US 2014/0348662 A1 Nov. 27, 2014

Related U.S. Application Data

(60) Provisional application No. 61/601,270, filed on Feb. 21, 2012, provisional application No. 61/600,165, filed on Feb. 17, 2012.

(51) Int. Cl.
B28B 5/00 (2006.01)
E04H 12/34 (2006.01)
(Continued)

(52) U.S. Cl.
CPC ................. *B28B 5/00* (2013.01); *B28B 7/0088* (2013.01); *E04G 11/20* (2013.01); *E04G 11/34* (2013.01); *E04H 12/12* (2013.01); *E04H 12/341* (2013.01); *F03D 11/04* (2013.01); *Y02E 10/728* (2013.01)

(58) Field of Classification Search
CPC .......... E04G 11/22; E04G 11/20; E04H 12/34; E04H 12/341; B28B 7/0088; B28B 5/00; Y02E 10/728
USPC .................... 52/292, 741.14, 745.15, 745.17, 52/745.09; 264/33; 425/63, 65, 60; 249/20
See application file for complete search history.

(56) References Cited

U.S. PATENT DOCUMENTS 1,075,454 A * 10/1913 Whipple .......................... 425/65
1,225,356 A * 5/1917 Polk ................................ 264/32
(Continued)

FOREIGN PATENT DOCUMENTS

DE 1933856 A1 1/1970
DE 2149157 A1 * 4/1972
(Continued)

OTHER PUBLICATIONS

International Search Report and Written Opinion; PCT/EP2013/052858; International Filing Date: Feb. 13, 2013; Siemens Aktiengesellschaft; 8 pgs.

*Primary Examiner* — Joshua J Michener
*Assistant Examiner* — Babajide Demuren
(74) *Attorney, Agent, or Firm* — Schmeiser Olsen & Watts LLP

(57) ABSTRACT

A concrete tower manufactured by an apparatus comprising a slipform, which is circumferentially guided in such a way that the slipform slides helically on top of the end face of the tower is provided. During the sliding, concrete is disposed by the slipform to the end face of the tower. After numerous revolutions, a low-cost tower is erected.

14 Claims, 5 Drawing Sheets

(51) Int. Cl.
*E04G 11/20* (2006.01)
*E04G 11/34* (2006.01)
*E04H 12/12* (2006.01)
*B28B 7/00* (2006.01)
*F03D 11/04* (2006.01)

(56) References Cited

U.S. PATENT DOCUMENTS

| | | | | |
|---|---|---|---|---|
| 1,891,160 A | * | 12/1932 | Jespersen | 264/32 |
| 2,314,468 A | | 3/1943 | Urschel | |
| 2,339,892 A | | 1/1944 | Urschel | |
| 2,339,893 A | | 1/1944 | Urschel | |
| 2,837,910 A | * | 6/1958 | Steed | 401/22 |
| 3,443,276 A | * | 5/1969 | Smith et al. | 425/4 R |
| 3,497,579 A | * | 2/1970 | Barron | 264/33 |
| 3,510,098 A | * | 5/1970 | Fox | 249/20 |
| 3,659,982 A | * | 5/1972 | Svensson et al. | 425/63 |
| 4,081,227 A | * | 3/1978 | Bohmer et al. | 425/65 |
| 4,193,750 A | * | 3/1980 | Nielson | 425/60 |
| 2003/0033772 A1 | * | 2/2003 | Russell | 52/292 |
| 2005/0129504 A1 | | 6/2005 | DeRoest | |
| 2010/0281819 A1 | | 11/2010 | Thompson | |
| 2011/0223272 A1 | * | 9/2011 | Stiesdal | 425/63 |
| 2011/0315691 A1 | * | 12/2011 | Skovholt | 220/560.12 |

FOREIGN PATENT DOCUMENTS

| | | | |
|---|---|---|---|
| EP | 2735674 A1 | * | 5/2014 |
| JP | 2011220042 A | * | 11/2011 |
| WO | 0107731 A1 | | 2/2001 |

* cited by examiner

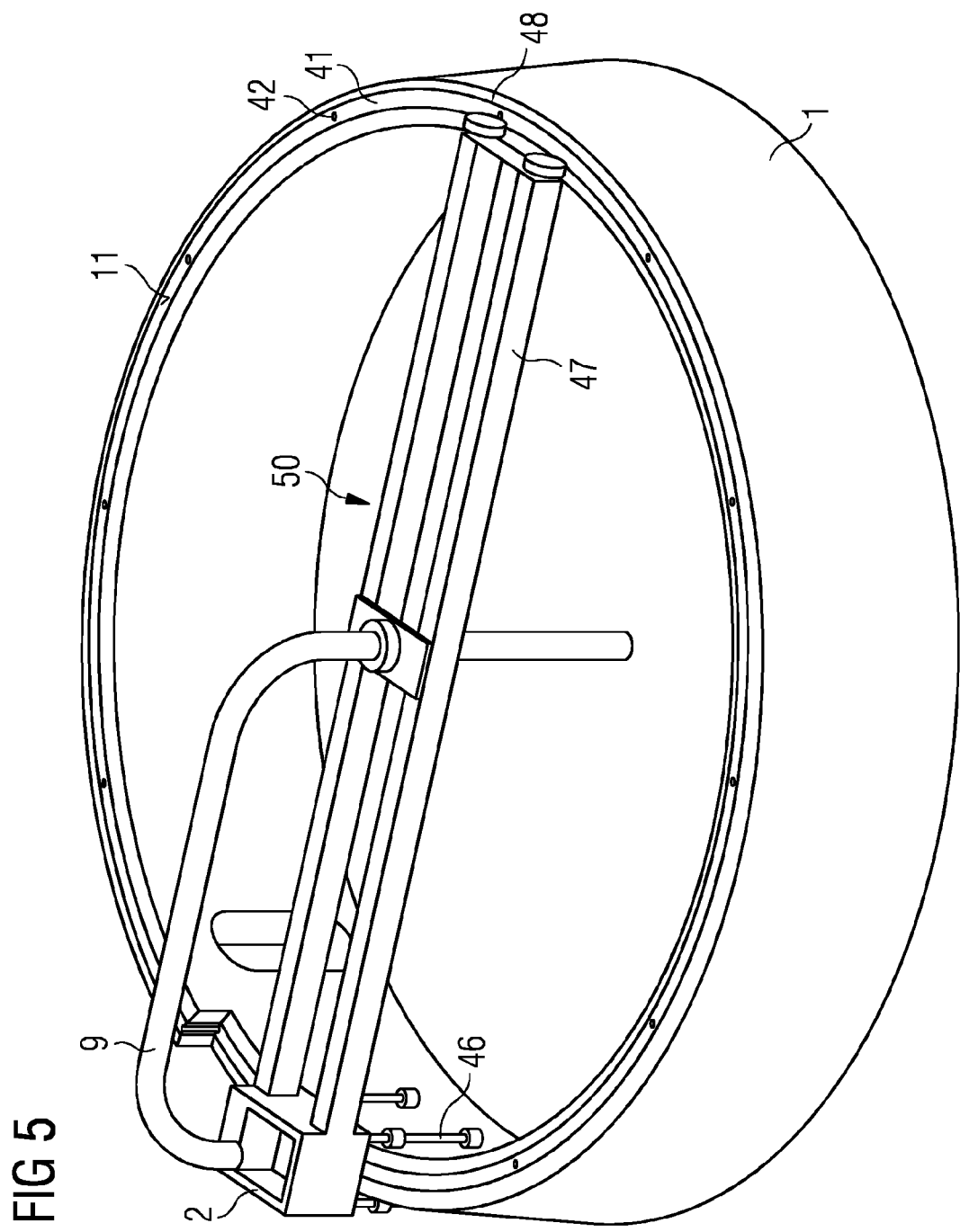

TOWER

CROSS-REFERENCE TO RELATED APPLICATIONS

This application claims priority to PCT Application No. PCT/EP2013/052858, having a filing date of Feb. 13, 2013, based off of U.S. Application No. 61/601,270 having a filing date of Feb. 21, 2012 and U.S. Application No. 61/600,165 having a filing date of Feb. 17, 2012, the entire contents of which are hereby incorporated by reference.

FIELD OF TECHNOLOGY

The following relates to a tower.

BACKGROUND

Wind turbine towers, especially tubular steel or concrete towers for large wind turbines, are large in diameter and weight. This may cause difficulties concerning the transportation of a tower to the wind farm and the used infrastructure. Usually, the steel or concrete towers for wind turbines are produced as sections in shops and the sections are then transported to the place of installation. The towers are typically constructed of a number of sections which have a cylindrical or conical shape. In the wind industry, the requirements for larger turbines have resulted in corresponding requirements for larger wind turbine towers. Larger wind turbine towers have typically lead to larger tower section diameters and longer and heavier tower sections. The dimensions of tall towers for large wind turbine have reached limits defined by the infrastructure of various countries. The limiting aspects are typically physical limits such as free height under bridges and tunnels, allowable weights or the turning radii of roundabouts.

The increasing number of turbines in large wind projects has also caused difficulties since the equipment which is needed to transport the largest tower sections by road or by rail is highly specialised and is not found in the quantities necessary for the present number of transportations. Consequently, when a large number of projects require a substantial amount of transportation time by road, the availability of special equipment may become difficult in the project phase.

The problem has been addressed by dimensioning, by the use of hybrid towers or by the use of modular towers. Dimensioning accepts the height and width restrictions of transportation routes and uses the restrictions as a design basis. This means in practice that the external tower diameter is fixed at a certain maximum value, typically 4.2 meters. When the diameter is fixed, then the wall thickness is dimensioned to provide the necessary stiffness and strength. For large turbines and tall towers this will typically lead to significantly higher weight. This causes higher costs compared with when no diameter restrictions are applied.

In a hybrid solution, the problem is circumvented by extending the concrete foundations significantly above ground level, for example, as a cylindrical structure of, for instance, 10 meters height. This increases the effective hub height of a wind turbine where the tower design is not significantly influenced by a diameter restriction. However, above a certain practical height an extended foundation is expensive. Compared with a diameter restricted tower, a hybrid solution tower reaches an additional height of perhaps 15 meters.

A wide range of modular precasted concrete towers are well known in literature and in practice. Using a longitudinal split, such solutions overcome the dimensional restrictions on transportation. However, difficulties occur in the assembly and the complexity of the modular elements.

WO 03/069099 A1 discloses a wind turbine comprising a stationary vertical tower on which the moving part of the wind turbine is arranged, which mast is at least partly composed from prefabricated wall parts with several adjacent wall parts forming a substantially annular mast part. WO 01/07731 discloses a tower manufactured by a slip form technique. This slip form technique uses vertical moving slip forms which are casting the whole circumference of tower in one process. However, it is difficult to vary the diameter of the tower.

SUMMARY

An aspect relates to a low-cost wind turbine tower with a variable dimensions.

Embodiments of the technique is a spiral moving continuous pouring process, where a slip form is moved substantially horizontally along the circumference of the structure to be built, while constantly building new concrete on top of already casted and hardened concrete. Embodiments of the invention can be advantageous in that the assembly is relatively simple with low moulding-tool and production costs. Embodiments of the invention can be further advantageous in that the circular reinforcement can be applied as the spiral is made.

BRIEF DESCRIPTION

Some of the embodiments will be described in detail, with reference to the following figures, wherein like designations denote like members, wherein:

FIG. 5 shows a third embodiment of a section of a tower and a device to manufacture the tower in a three-dimensional view.

DETAILED DESCRIPTION

Figure 1:
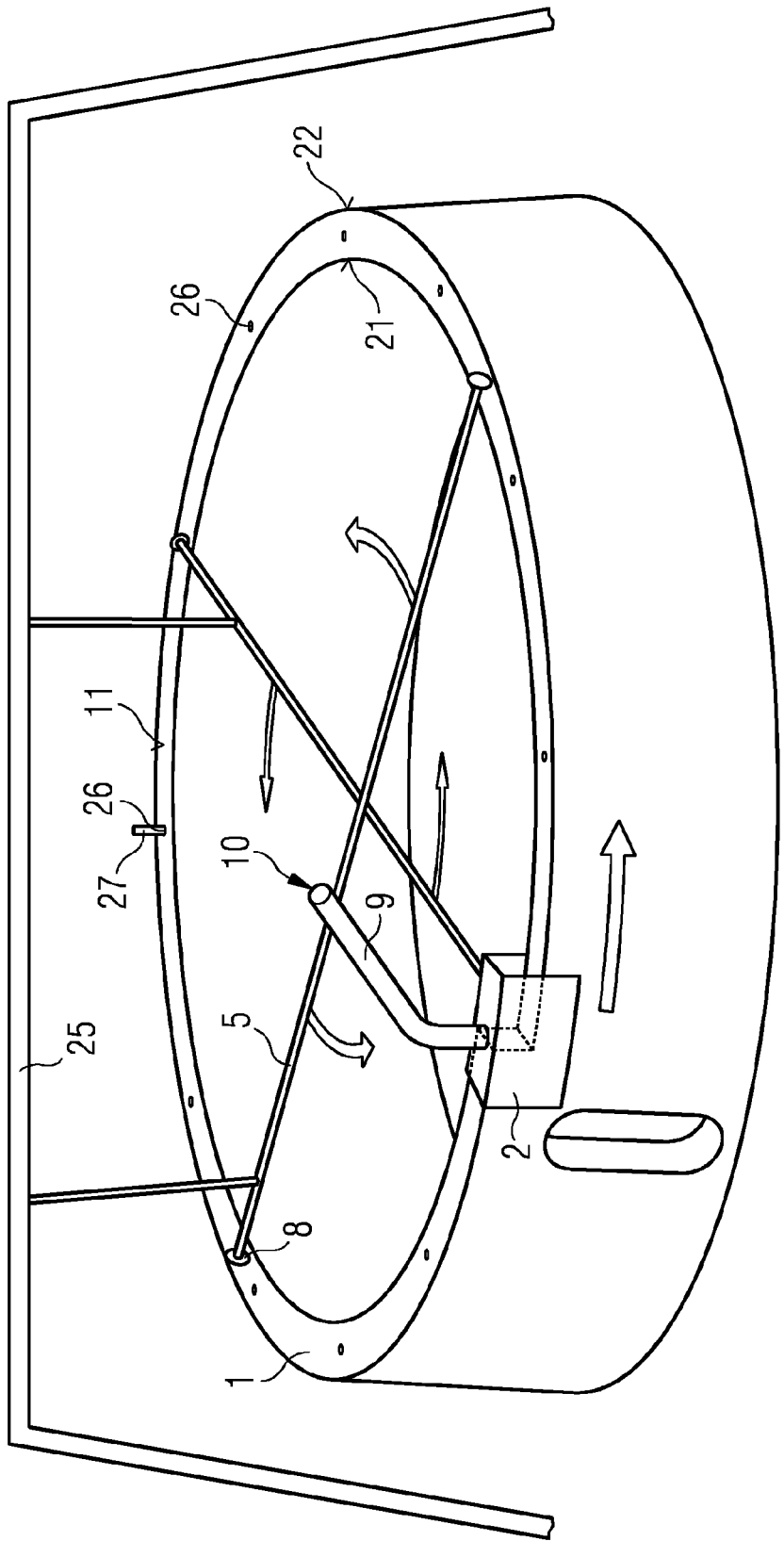
FIG. 1 shows a first embodiment of a section of a tower and a device to manufacture the tower in a three-dimensional view.
Figure 2:
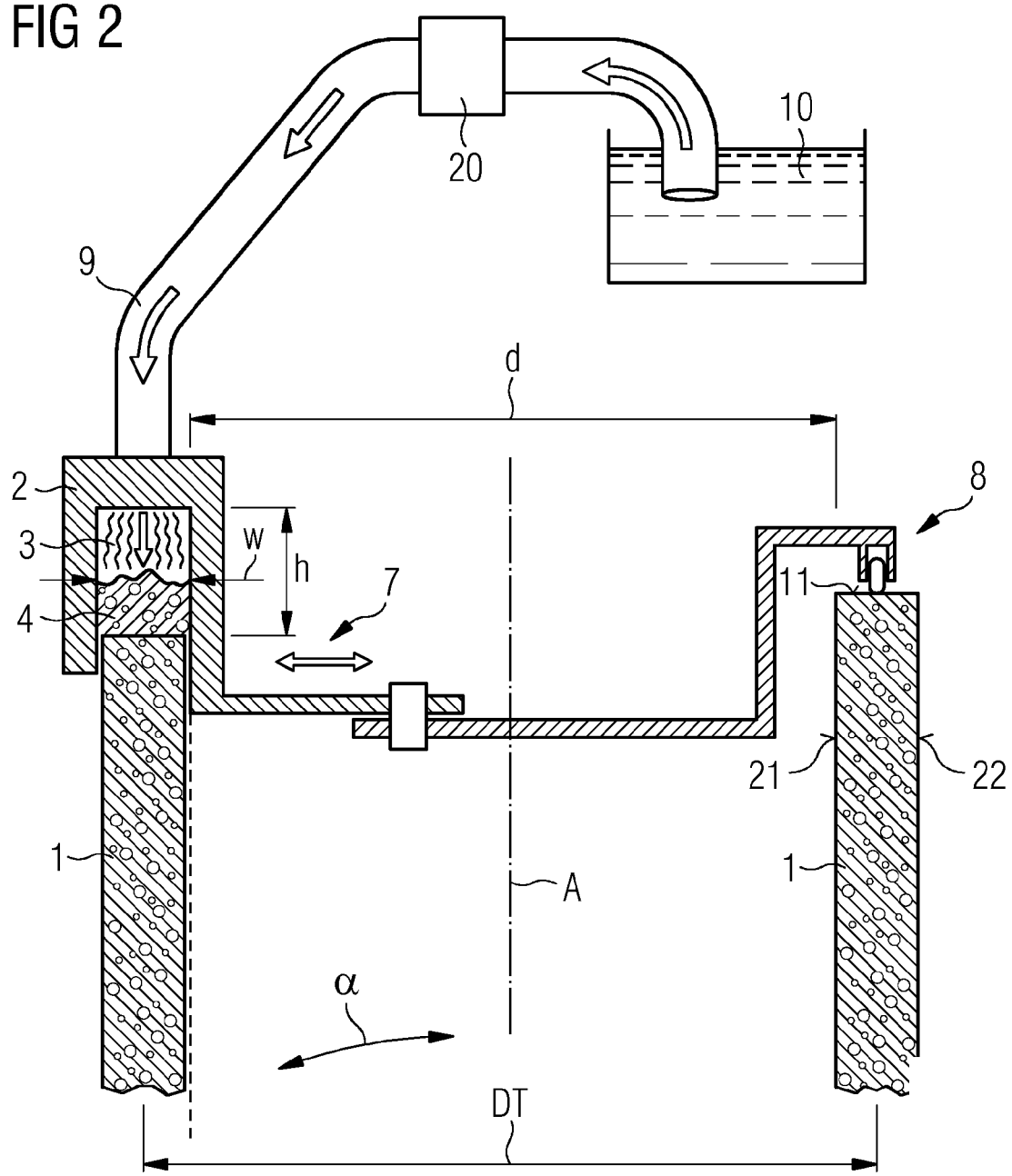
FIG. 2 shows an embodiment of the tower and the device of FIG. 1 in cross section.

FIGS. 1 and 2 show a first embodiment of a section of a tower 1 and a device 2, 5, 7 to manufacture the tower 1 in a three-dimensional view and a cross-sectional view. The casted walls of the tower 1 comprise ducts 26 prepared for receiving wires to prestress the concrete tower axially or circumferentially once casted. These ducts 26 are constructed while slipforming, and may be lined or may not be lined.

The ducts 26 are vertical holes 26 which are introduced circumferentially into the tower 1 and can be used for pretensioning wires. The holes 26 can be produced by fixing cylindrical, preferably slightly rejuvenating pins 27 vertically into the holes 26 of hardened concrete 10, by disposing the fluid concrete 10 on the top of the end face 11 of the tower 1 and by removing the pin 27 after hardening of the disposed concrete 10.

The device to manufacture the tower 1 comprises some carrying structure 5 which supports the slip form 2 itself. The carrying structure 5 is at least partly able to perform a spiral formed guidance of the slip form 2 as indicated by arrows in FIG. 1. The slip form 2 has an inner design which is complementary to the desired outer design of the tower 1.

Wet, i.e. liquid and non-hardened concrete 10 is pumped by a concrete pump 20 through a concrete guide 9 and poured into the slip form 2 which distributes the concrete 10 to the top of the tower. The slip forming is a spiral/helical moving continuous pouring process, where the slip form 2 is moved substantially horizontally along the circumference of the structure, e.g the tower 1 to be built, while constantly building new concrete 10 on top of already casted and hardened concrete of the tower 1.

The concrete tower 1 is made by an apparatus comprising a slipform 2, which is circumferentially guided in such a way that the slipform slides helically on top of the end face 11 of the tower 1. Concrete is disposed through the concrete guide 9 and by the slipform 2 to the end face 11 of the tower 1. The slipform 2 is carried by the support device 5, 7, which is circumferentially guided by a geometric shape 11, 21, 22 of the tower 1 in such a way that the slipform 2 slides helically on top of the end face 11 of the tower 1. The support device 5, 7 is guided on wheels 8 on the end face 11 of the tower 1 in vertical direction. The inner vertical walls of the slipform 2 are guided by the inner surface 21 and outer surface 22 of the tower 1 in radial direction. The diameter of the support device 5, 7 can be varied to create a tower 1 with varying diameters. The geometric shape 11, 21, 22 of hardened concrete 10 provided in one of the previous circumferential rotations of the slipform 2 on top of the tower 1.

Optionally, the thickness, i.e. the inner width W, the angle α in relation to the axis A of the tower 1 and/or the height h of the slip-form 2 can be varied, so that the tower 1 can be designed free, e.g. to create a different width or diameter DT of the tower 1 or a tapered tower 1 with a diameter decreasing with increasing height of the tower 1.

In FIG. 1, the support device 5, 7 is connected to a protection element 25 which protects at least the non-hardened concrete 10 disposed on the end face 11 of the tower 1 against environmental impacts.

Figure 4:
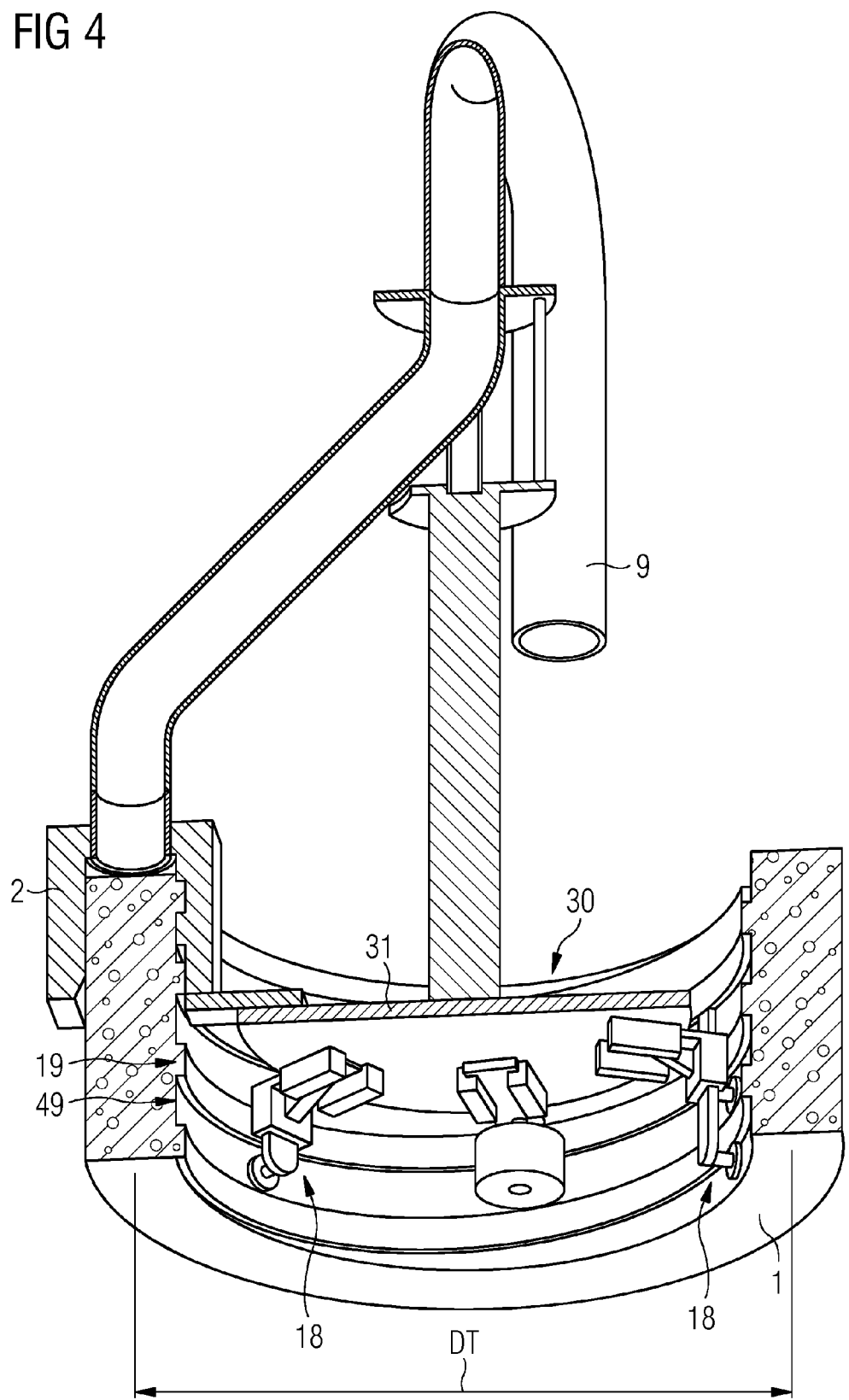
FIG. 4 shows a second embodiment of a section of a tower and a device to manufacture the tower in a three-dimensional view.

As can be seen in FIGS. 1, 2, 4 and 5, the function of the different carrying structures (support devices) 5, 7, 8 of FIGS. 1 and 2; support means 18, 30 of FIG. 4; or support device 50 of FIG. 5, is to hold and support the slip form 2 and also some supporting means 8, 18 which holds the respective carrying structure in the correct vertical position for the slip form assembly 2 in relation to the already casted concrete of the tower 1. Alternatively, the carrying structure 5 and the support means 8 are not necessary if it is just a wagon in front of the slip-form 2.

The slip form 2 has a degree of freedom so that the assembly is possible to move in the horizontal direction in order to vary the diameter of the casted tower 1—as indicated by arrows 7 in FIG. 2. Wet concrete 3 is poured into the slip form 2 by the concrete guide 9 and is processed to take a solid form 4 and to fill the entire height h and width w of the slipform 2 so as to cast a defined concrete piece on top 11 of the already casted concrete 1. For this embodiment of the invention, the supporting means (wheels or sliding elements) 8 running on top 11 of the tower 1 and supporting the carrying structure 5 is constructed so as to carry while supported on top 11 of the already casted and hardened concrete tower 1.

Figure 3:
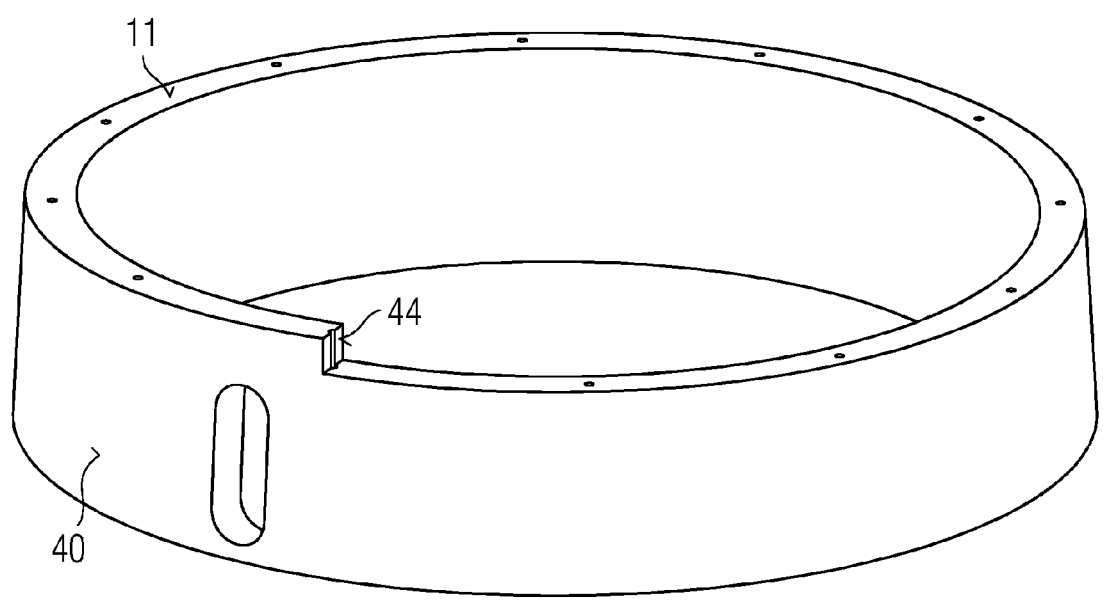
FIG. 3 shows an embodiment of a precasted tower segment on which the tower will be erected in three-dimensional view.

For one embodiment of the invention shown in FIG. 3, the slip casting process is only applied for building a part of the tower 1. For such situation, it might be necessary to build or cast a lower distal part 40 of the tower 1 separately as schematically indicated on the FIG. 3.

This distal part 40 may comprise a linear (spiral) increase in height along its top-circumference with an abrupt discontinuity 44 at some "full circle" point. This abrupt discontinuity 44 may be the starting location for the invented moulding assembly to be applied. From this point, the moulding assembly/slipform 2 will take over and mould the rest of the tower 1 in a spiral slip form moulding manner.

The sliding of the slipform 2 starts on top 11 of a precasted tower element 40 at the step, i.e. the discontinuity 44 of the precasted tower element 40 in circumferential direction. This distal part 40 may be casted in one piece on site, multiple pieces on site or may be precasted elements casted from an external element production site.

In the FIG. 4, another embodiment of the device to slipform a tower 1 with alternative support means 18, 30 is shown. The supporting means (wheel or sliding construction) 18 carries a platform 31 which carries the concrete guide 9 and the slipform 2. The supporting means 18 are horizontally movable in relation to the platform 31 thus enabling changing the radial position of the slipform 2 and to vary the diameter DT of the tower 1. The inner surface of the tower 1 comprises casted spiral nosing 19 and a spiral groove 49 produced by the casting form of the slipform 2. This is schematically illustrated in FIG. 4. The slipform 2 comprises a container 3 with a negative shape of a geometric form (defined by spiral nosing 19 and spiral groove 49) to produce the tower 1 with said geometric form with a spiral groove 49 and a spiral nose 19 during the circumferential sliding of the slipform 2.

In another embodiment, the mould assembly with a slipform 2, a concrete guide 9 and a carrying structure/support device 50, 46, 47, 48 is schematically illustrated in FIG. 5. Two parallel balks 47 run diametrical on top 11 of the tower 1 and carry the slipform 2 and a part of the concrete guide 9. Each two vertical rollers 46 are connected to the bottom of the slipform 2 contacting the inside and the outside surfaces of the tower 1. While slipforming, circular 41 and/or vertical concrete reinforcements 42 are being applied to the tower 1. While slipforming, the dimensions of the tower 1 are measured and controlled.

The invention claimed is:

1. A method to produce a concrete tower, comprising the steps of: utilizing a slipform, wherein the slipform is carried by a support device; and circumferentially guiding the slipform to slide helically on a top of an end face of the concrete tower disposing concrete by the slipform to the end face of the concrete tower while the concrete tower is prestressed, and the slipform has a first end and a second end separated by a section of the slipform that spans across a diameter of the concrete tower, both the first end and the second end physically engaging the concrete tower; and forming a helical groove into the concrete tower along an inner surface of the concrete tower to guide the support device.

2. The method according to claim 1, guiding the slipform in a radial and/or a vertical direction by at least one geometric shape of hardened concrete created in one of a plurality of previous circumferential rotations of the slipform on the top of the concrete tower.

3. The method according to claim 1, filling a container of the slipform with concrete during sliding, wherein said container comprises a pre-determined inner width and an inner height.

4. The method according to claim 1, protecting at least a non-hardened concrete disposed on the end face of the concrete tower against environmental impacts with the section of the slipform.

5. The method according to claim 1, wherein an angle of the slipform against a vertical axis and/or an inner width of the slipform and/or an inner height of the slipform and/or a diameter of the helical movement of the slipform is adaptable dependent on a required shape of the concrete tower.

6. The method according to claim 1, further comprising a step of circumferentially creating a plurality of vertical holes for pretensioning cables into the tower by fixing cylindrical, rejuvenating pins vertically into a plurality of holes of hardened concrete; disposing the fluid concrete on the top of the end face of the tower; and removing the pins after hardening of the disposed concrete.

7. The method according to claim 1, wherein during the circumferential sliding of the slipform comprises using a container with an opposingly corresponding shape of a geometric form to produce the concrete tower with said geometric form.

8. The method according to claim 1, sliding the support device on wheels or sliding surfaces.

9. The method according to claim 1, carrying at least a part of a concrete guide with the support device.

10. The method according to claim 1, wherein a step of measuring and controlling the dimensions of the concrete tower occur during slipforming.

11. The method according to claim 1, wherein applying circular and/or vertical concrete reinforcement during the circumferential sliding of the slip form.

12. The method according to claim 1, wherein the sliding of the slipform starts on a top of a precasted tower element at the a step defined by a discontinuity of the precasted tower element in a circumferential direction.

13. A wind turbine tower, wherein the wind turbine tower is produced by the method of claim 1.

14. The method of claim 1, wherein the first end includes a container of the slipform, and the second end includes at least one wheel.

* * * * *